United States Patent [19]

Strinning

[11] 4,051,269
[45] Sept. 27, 1977

[54] LOW CALORIE, HIGH PROTEIN TABLESPREADS FROM SWEET MILK AND THEIR PRODUCTION

[75] Inventor: Olof Bo Sven Strinning, Saltsjobaden, Sweden

[73] Assignee: Mjolkcentralen, Ekonomisk Forening, Stockholm, Sweden

[21] Appl. No.: 759,471

[22] Filed: Jan. 14, 1977

Related U.S. Application Data

[63] Continuation-in-part of Ser. No. 608,700, Aug. 28, 1975, abandoned, and Ser. No. 673,059, April 2, 1976, abandoned.

[30] Foreign Application Priority Data

Aug. 29, 1974 Sweden .............................. 7410940

[51] Int. Cl.$^2$ .............................................. A23D 3/00
[52] U.S. Cl. .................................................. 426/603
[58] Field of Search ............... 426/580, 581, 583, 585, 426/603, 657, 663

[56] References Cited

U.S. PATENT DOCUMENTS

| | | | |
|---|---|---|---|
| 3,266,904 | 8/1966 | Duin et al. | 426/604 |
| 3,922,376 | 11/1975 | Strinning et al. | 426/603 |

*Primary Examiner*—Raymond N. Jones
*Assistant Examiner*—R. A. Yoncoskie
*Attorney, Agent, or Firm*—Millen & White

[57] ABSTRACT

Low calorie, high protein edible water-in-oil emulsions formable into margarine-like tablespreads are produced from sweet milk protein concentrates by heating to 70°–105° C., an aqueous concentrate of sweet milk proteins having a pH-value of at least 5.1; cooling the heated protein concentrate to 55°–38° C.; and emulsifying the cooled protein solution into an edible oil to form a 65–35% aqueous phase, 35–65% oil phase, water-in-oil emulsion. The emulsion is thereafter further cooled to a temperature at which the emulsion is stable to form a margarine-like tablespread.

10 Claims, 1 Drawing Figure

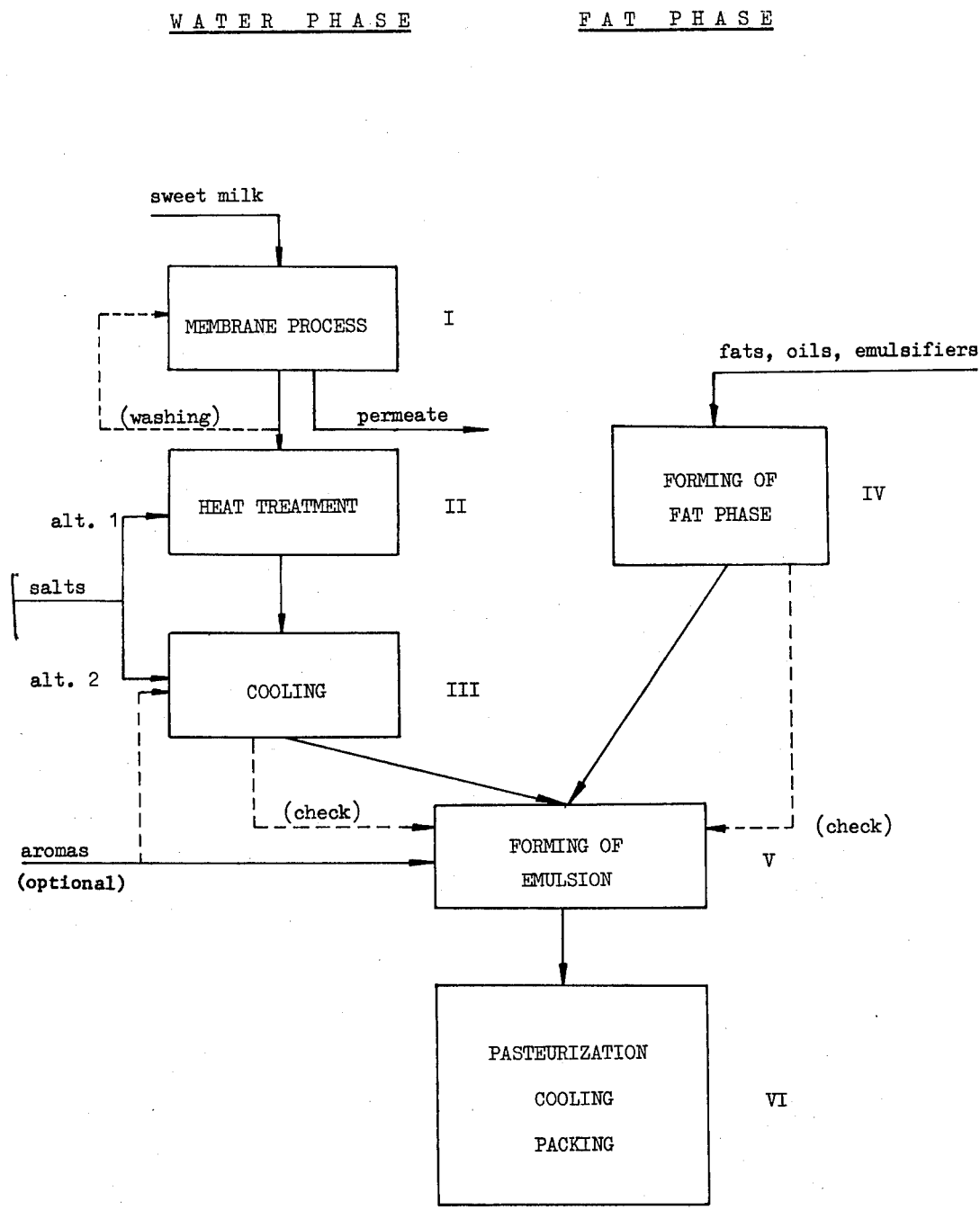

LOW CALORIE, HIGH PROTEIN TABLESPREADS FROM SWEET MILK AND THEIR PRODUCTION

BACKGROUND OF THE INVENTION

This is a continuation-in-part of application Ser. No. 608,700, filed Aug. 28, 1975, and Ser. No. 673,059, filed Apr. 2, 1976, both now abandoned.

This invention relates to a method for the production of low calorie, high protein content margarine-like, water-in-oil emulsions. This invention also relates to the novel emulsions and dairy spreads thus-produced.

There are several known methods for the production of low calorie, high protein margarine-like, water-in-oil emulsions. See, e.g., U.S. Pat. No. 3,922,376 and references of record therein. In the known methods, the proteins of the aqueous phase are those obtained by the precipitation of proteins from milk products by acidification of a solution of milk protein to a pH-value of about 2.0 and 4.7 and under all circumstances not exceeding 5.0.

Such methods of producing the milk proteins for the aqueous phase have several disadvantages. Although a rather good precipitation of the casein proteins is achieved by acid precipitation, a very incomplete precipitation of the whey proteins is achieved. Normally, a maximum of only about one-third of the whey protein can be precipitated thus leaving the remaining two-thirds of the whey proteins as a by-product.

Due to the low pH-value of the resulting precipitated milk product, a comparatively sour final product is obtained which contributes to an increased oxidation speed of the emulsion produced therefrom, which reduces the storage life of the emulsion.

It is well known that casein has a lower nutriment value than the mixture of casein and whey protein of whole milk. Another disadvantage of the prior art methods of producing spreads from sour or acidified milk products is that it does not permit use therein of most of the permit use therein of most of the nutritionally more valuable whey protein. A further disadvantage is that the sour whey obtained as a by-product has such low nutrient value that it has limited economic value and is of such high acidity that the isolation of the whey proteins therefrom produces a variety of problems due to its comparatively high water content and the hygroscopic propeties of the whey proteins, which make it difficult to dry them into a powder.

It is an object of this invention to provide a method for the production of a low calorie, high protein margarine-like, water-in-oil emulsion having a substantially higher whey protein content. It is another object to provide a sweet or only slightly soured such product of enhanced properties compared to corresponding water-in-oil emulsions prepared from acid precipitated proteins. Other objects will be apparent to those skilled in the art.

SUMMARY OF THE INVENTION

In its process aspect, this invention relates to the production of low calorie, high protein, edible water-in-oil emulsions formable into margarine-like dairy spreads by heating to 70°–105° C. an aqueous concentrate of sweet milk proteins having a pH-value of at least 5.1; cooling the heated protein concentrate to 55°–38° C.; and emulsifying the cooled protein solution into an edible oil to form a 65–35% aqueous phase, 35–65% oil phase, water-in-oil emulsion. The emulsion is thereafter further cooled to a temperature at which the emulsion is stable to form a margarine-like tablespread.

In composition aspects, this invention relates to the novel emulsions and tablespreads thus-produced.

DETAILED DISCUSSION

This invention is based on the discovery that it is possible and of advantage to provide the proteins for the aqueous phase of water-in-oil, margarine-like emulsions from sweet or only slightly soured milk products which have a pH-value above 5.1 e.g., 5.1–7.2, preferably higher than pH 5.8, e.g., from 6.0–7.0. Examples of such milk products are unsoured or sweet milk, skim milk, sweet buttermilk, sweet whey or any combination of such products having such a pH-value.

In order to obtain a concentrate of both the casein proteins and all or almost all of the whey proteins, the milk or the milk mixture is subjected to a concentration process which retains the proteins in stable suspension, preferably by removal of a portion of the water from such products by membrane process. Examples of such membrane processes are ultra filtration and dialysis. Gel filtration may be used as a part step of such a process. By such a process, it is possible to retain practically all of the milk proteins, i.e., both the casein and the whey proteins.

Thereafter, the thus-produced aqueous protein concentrate is employed for the production of the high protein, low calorie margarine-like dairy spreads described hereinafter with reference to the accompanying drawing, which is a schematic flow diagram of a process method according to this invention, wherein in a conventional manner the aqueous phase described above and an edible oil phase are produced independently of each other, and thereafter the aqueous phase is emulsified into the fat phase to provide a water-in-oil emulsion. In the illustrated flow diagram, the steps employed for the production of the aqueous phase are designated I, II and III, and the step employed for the oil phase, conducted in a conventional manner, is designated IV. The emulsification and the final treatment of the oil emulsion are designated V and VI.

Preparation of the Aqueous Phase

Step I

The starting aqueous phase is a concentrated solution, i.e., one having a 9–24%, preferably 14–20%, by weight protein content of sweet milk proteins. Sweet milk proteins are those which have not been soured or, at most, only slightly soured, i.e., not below a pH-value of 5.1, and thus include not only the casein proteins but also all or substantially all of the whey proteins, most of which remain in the solution when the casein proteins are precipitated by acidification, either chemically or bacteriologically, and has a pH-value of at least pH 5.1 and preferably above 5.8, e.g., 6.0–7.0. The starting sweet milk or sweet milk product is subjected to a membrane sepration step, e.g., ultrafiltration or dialysis, in which gel filtering optionally can be used as part of the concentration step. In addition, gel filtering together with, for example, low temperature evaporation, may also be used. In this process, a permeate is filtered away which consists mainly of lactose, salts and water and a retentate is obtained consisting of a concentrated protein solution containing practically all the casein proteins and nearly 100% of the whey proteins. A small portion of the lactose and the milk salts is usually also retained in the retentate which can be removed, if desired, by dialysis filtration or diafiltration. In such a process, water is added which is filtered away together with the residual lactose and the salts. The protein concentrate which is obtained has a protein content of 9–24%, preferably 14–20%. The concentration step is normally conducted at 4–20° or 50–65° C., preferably 10° or 55° C., although any temperature above the freezing point of the concentrate, e.g., up to about 85° C., can be employed. However, the cited temperatures are preferred to avoid the possibility of bacterial growth during the treatment.

Such filtration occurs at a high rate when the pH-value is higher than 6. In contradistinction, the filtration rate is very low at a pH from 5.5 to 3.5.

The permate, obtained as a by-product, in spite of its very low protein content, has better properties for use than the corresponding product obtained by acid precipitation of the casein proteins. It has a higher pH-value and it can be dried to powder and used as fodder. It thus does not involve environmental disposal problems.

Step II

In this step, the temperature of the protein concentrate is raised from 70° to 105° C., preferably from 90° to 95° C., for a period of time from 45 minutes and 1 second. By maintaining the concentrate in this temperture range, the proteins thereof are denaturated in such a way that both its water holding and its emulsifying properties are increased. At a temperature of 90°–95° C., a holding time of from 1 minute to 10 seconds is suitable. At lower temperatures, a corresponding longer holding time and at higher temperatures corresponding shorter holding times should be employed, the lower limit being that at which denaturation does not occur and the upper limit being that at which cooking and corresponding change in flavor occurs.

In this step, edible salts, e.g. sodium or potassium chloride, phosphate and citrate optionally may be added, e.g., in amounts from about 1 to 5% by weight of the aqueous phase. Sodium chloride is normally added and is very active if added before the heat treatment to enchance the flavor of the product. Phosphates and citrates are used as calcium binding ions and are added in such a buffering amount which brings the pH-value of the protein concentrate, which may during the previous step have changed from that of the starting material, back to about the same value as of the starting material. For example, if the pH-value of the starting material is between pH 6.3 and pH 6.8 and the pH-value during the previous step has become lowered, e.g., to below 6.0, the value is adjusted upward with the phosphate and/or citrate salts of 6.0 to 7.0.

The citrates and phosphates also influence the consistency of the protein concentrate, and may therefore also be added for the additional purpose of regulating the consistency of the aqueous phase.

Step III

In this step, the temperture of the protein concentrate is lowered to 55° to 38° C., preferably 50° to 45° C., which is a suitable temperature range for the emulsification step. The salts described above can be added in this step in the same manner as in Step II to modify the taste of the final product and/or to control the consistency of the water phase and to adjust the pH-value. The possibility of adding consistency-controlling salts in either Step II or Step III or both offers a wide variety of possibilities for regulating the properties of the final product, thus making it possible to quickly adapt the products to different market demands and to adapt the process to different starting materials as they vary from time to time.

A technical advantage is achieved by modifying the above-described cooling step, so that the protein concentrate is cooled in two successive stages, with an intermediate holding time. In so doing, it is possible to increase the viscosity of the aqueous phase, to increase the water holding properties of the protein and to obtain a smoother final product with increased emulsion stability. In such a modified cooling step, the hot protein concentrate is preferably cooled to 70°–55° C., then kept in this temperature range for from 30 minutes to 2 hours, and the protein concentrate is then cooled in a second stage to a suitable emulsion forming temperature, e.g., 55°–38° C., preferably 50°–45° C.

Step IV

In this phase, an oil phase is prepared independently of the aqueous phase in a conventional manner employing, e.g., butter fat or a vegetable oil, alone or in combination with an emulsifier and flavoring agent. Conventional margarine fat mixtures can also be used. Preferably, a mixture of polyunsaturated vegetble oil and butter fat is employed, e.g., 30–60% of the former and 70–40% of the latter. The oil phase, like the aqueous phase, is heated to 38°–55° C., preferably 45°–50° C.

A contemplated and obvious equivalent of cooling the aqueous phase to 55°–38° C. and of heating the oil phase to 55°–38° C. is to employ one of these phases at a higher temperature and one at a lower temperature such that the two phases when mixed are at 55°–38° C.

Step V

In this step, the water-in-oil emulsion is formed by adding, successively, preferably the aqueous phase to the oil phase while mechanically mixing it therein. The mechanical mixing can be conducted batchwise or continuously. Vigorous mixing is employed to ensure the desired water-in-oil emulsion is formed. The fat content is regulated by the amount of aqueous phase which is added or, if necessary, by further additions of the aqueous phase so that the fat content of the final emulsion is 35–65%, preferably 39–41%. During this step, aroma agents optionally may be added or, alternatively, they may be added in Step III.

Step VI

After the emulsion is formed, the product is made ready for storage in the conventional manner, e.g., by pasteurization at 72° C. for 15 seconds or a corresponding suitable time/temperature combination, followed by cooling, preferably to below 12° C., to a temperature at which the emulsion is stable, i.e., storable. The pasteurized and cooled product can then be packaged, preferably hermetically in a conventional manner.

The cooling is preferably done in scraped surface heat exchangers.

The protein concentrate may, before the heat treating at Step II or after the cooling at Step III, temporarily be acidified to impart an aroma to the product. The acidification should be limited and the pH-value should not at anytime be lower than 5.2. After acidification, the pH-value of products raised to 6.0–7.0, preferably from 6.3–6.8. The raising of the pH-value requires relatively little neutralizing agent since the acidification causes the formation of only relatively small amounts of lactic acid.

The margarine-like, water-in-oil emulsion tablespreads of this invention have the following properties:

Aqueous phase: 65–35%, preferably 61–59%
  protein content of aqueous phase: 9–24%, preferably 14–20%
    casein proteins: 70–90%, preferably 80–85%
    whey proteins: 30–10%, preferably 20–15%
  pH: 5.1–7.2, preferably 6.0–7.0
  Total edible salts content: 1.4–6.0%
  NaCl content: 1–5%
Oil phase: 35–65%, preferably 39–41%
  % animal oils: 0–100%, preferably 45–60%
  % vegetable oils: 100–0%, preferably 55–40%
  % polyunsaturates: 4–40%, preferably 20–30%
Spreadability: 4°–15° C.
Texture: Smooth, butter-like Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

60 kg. of a protein concentrate having a protein content of 17.8% was obtained by ultrafiltering 335 kg. of skim milk. There was also obtained as the by-product 275 kg. of sweet protein-free permeate of good quality. To the protein concentrate was added 1.2 kg. NaCl, 0.1 kg. Na$_3$-citrate-2H$_2$O. The protein concentration was reduced to 15% with water. The protein concentrate was then heated in a plate heat exchanger at 95° C. for 3 minutes. The mixture was then cooled to 50° C.

60 kg. of the heat-treated protein concentrate was emulsified into a molten fat mixture at 50° C. consisting of 18 kg. of soy oil, 22 kg. of butter oil and 280 g. of a commercial monoglyceride mixture emulsifier. The mixture was pasteurized at 75° C. for one minute and was thereafter cooled in a conventional two-stage scraped surface cooler to a packing temperature of 8° C. The product, after cool storage (6° C.) for 24 hours for 30 days, had excellent spreadability and consistency.

EXAMPLE 2

A protein concentrate was prepared according to Example 1, except 0.2 kg. disodium hydrogen phosphate was employed instead of the sodium citrate. The mixture was heat-treated in a water bath for 30 minutes at 85° C. Thereafter, the mixture was cooled to 50° C. The protein content was adjusted to 13.5% with water at 50° C. 60 kg. of the heat-treated protein concentrate was emulsified into a molten fat mixture at 45° C. consisting of 10 kg. of soy oil, 30 kg. of butter oil and 300 g. of a commercial monoglyceride mixture as emulsifier. To the resultant mixture was added 20 g. of a conventional butter aroma agent. The mixture was treated like in Example 1. The resultant product had good spreadability down to 0° C. and a butter-like pleasant aroma.

EXAMPLE 3

60 kg. of a protein concentrate having a protein content of 15.3% was prepared by ultrafiltration of skim milk as in Example 1. Starter culture was added and the product was kept at 20° C. When the pH-value had become lowered to 5.1, the mixture was neutralized with an aqueous NaOH solution to pH 6.75. 1.8 kg. of NaCl was added and the protein mixture was then heat-treated in accordance with Example 1 and then cooled to 48° C. 0.25 kg. of disodium hydrogen phosphate was then added, and the protein concentrate was then treated as in Example 2.

When panel tested, the product was judged as having properties which was fully comparable with similar products.

EXAMPLE 4

100 kg. of a fat emulsion was produced in accordance with Example 3, except a conventional margarine fat mixture was used as the fat mixture. The emulsion was pasteurized in a plate heat exchanger at 72° C. for 3 minutes, whereupon the product was cooled with a scraped surface heat exchanger to 16° C. and was packed. The final product had a clean taste and an attractive appearance.

EXAMPLE 5

A protein concentrate was prepared and heat-treated as described in Example 1. Thereafter the mixture was cooled in two successive steps, in the first step to 60° C., where the mixture was kept for 37 minutes, and in the second step, to 48° C. The heat-treated protein concentrate was thereafter treated as in Example 1.

The final product exhibited very good spreadability over a large temperature range and had good smoothness and a clean taste and aroma.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for the production of low calorie, high protein edible water-in-oil emulsion tablespreads from sweet milk proteins, which comprises heating to an aqueous concentrate of sweet milk proteins at 70°–105° C. for a period of time that the proteins thereof are denatured in such a way that both its water holding and its emulsifying properties are increased, said concentrate is obtained by membrane filtration of at least the aqueous phase of sweet milk and having a protein content of about 9–24% by weight and a pH value of at least 5,1; cooling the heated protein concentrate to 55°–38° C; introducing the cooled protein solution into an edible oil and forming a 65–35% aqueous phase, 35–65% oil phase water-in-oil emulsion; and then further cooling the emulsion to a temperature at which it is storable to form a margarine-like tablespread.

2. A process according to claim 1, wherein the starting protein concentrate has a pH above 5.8.

3. A process according to claim 1, wherein the starting protein concentrate is heat-treated at 90°–95° C. and then cooled to 50°–45° C. before emulsification.

4. A method according to claim 1, wherein the starting protein concentrate has a protein content of about 14–20%.

5. A method according to claim 1, wherein the protein concentrate is heat-treated at 90°–95° C. for 60–10 seconds.

6. A method according to claim 1, wherein prior to the heat-treatment or after the cooling step, the protein concentrate is temporarily acidified to a pH not below 5.2 until an aroma is imparted thereto and then brought to a pH of 6.0–7.0.

7. A method according to claim 1, wherein one or more calcium binding salts are added to the protein concentrate before or during the heat-treatment or during the cooling step, or both.

8. A method according to claim 1, wherein the cooling step is conducted in successive steps, in the first to 70°–55° C., at which temperature the protein concentrate is maintained for from 30 minutes to 2 hours, and in the second step of 55°–38° C.

9. A method according to claim 1, wherein the starting protein concentrate is produced from skim milk.

10. A method according to claim 9, wherein the starting protein concentrate has a pH above 5.8, wherein the starting protein concentrate is heat-treated at 90°–95° C. and then cooled before emulsification, wherein the starting protein concentrate has a protein content of about 14–20%, wherein the cooling step is conducted in successive steps, in the first to 70°–55° C., at which temperature the protein concentrate is maintained for from 30 minutes to two hours, and in the second step to 55°–38°, wherein prior to the heat-treatment or after the cooling step, the protein concentrate is temporarily acidified to a pH not below 5.2 until an aroma is imparted thereto and then brought to a pH of 6.0–7.0, and wherein one or more calcium binding salts are added to the protein concentrate before or during the heat-treatment or during the cooling step, or both.

* * * * *